United States Patent
Cheever et al.

[19]

[11] Patent Number: 6,108,909
[45] Date of Patent: *Aug. 29, 2000

[54] GROOVE FORMING PROCESSES FOR SHAFT OUTER DIAMETER

[75] Inventors: Charles J. Cheever, Beaverton; Frank Alton Gray, Portland; Mark Hazelton, Philomath; Johannes van Witzenburg, Lake Oswego, all of Oreg.

[73] Assignee: SAE Magnetics (H.K.) Ltd., Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,246

[22] Filed: Jul. 2, 1996

[51] Int. Cl.⁷ .............................. B21D 53/10; B21K 1/10
[52] U.S. Cl. ......................... 29/898.02; 384/100; 72/88
[58] Field of Search ................... 29/898, 898.02, 29/898.057, 603.03, 465, 466, 898.13; 384/100, 114; 72/88, 90

[56] References Cited

U.S. PATENT DOCUMENTS

| | | | |
|---|---|---|---|
| 4,427,308 | 1/1984 | Sandberg | 384/115 |
| 4,445,793 | 5/1984 | Shinohara | 384/130 |
| 4,487,514 | 12/1984 | Mori | 384/113 |
| 4,547,081 | 10/1985 | Tanaka et al. | 384/107 |
| 4,646,549 | 3/1987 | Saito et al. | 72/88 |
| 4,726,693 | 2/1988 | Anderson et al. | 384/114 |
| 4,795,275 | 1/1989 | Titcomb et al. | 384/107 |
| 4,797,009 | 1/1989 | Yamazaki | 384/100 |
| 4,805,972 | 2/1989 | Tanaka et al. | 350/6.7 |
| 4,882,916 | 11/1989 | Anderson | 72/469 |
| 5,018,880 | 5/1991 | Nakasugi et al. | 384/112 |
| 5,018,881 | 5/1991 | Asada | 384/113 |
| 5,060,497 | 10/1991 | Takahashi et al. | 72/68 |
| 5,067,528 | 11/1991 | Titcomb et al. | 141/4 |
| 5,096,309 | 3/1992 | Nakasugi et al. | 384/112 |
| 5,097,164 | 3/1992 | Nakasugi et al. | 310/88 |
| 5,112,141 | 5/1992 | Asada et al. | 384/100 |
| 5,112,142 | 5/1992 | Titcomb et al. | 384/107 |
| 5,120,139 | 6/1992 | Asada et al. | 384/107 |
| 5,160,866 | 11/1992 | Hishida et al. | 310/90 |
| 5,195,119 | 3/1993 | Ono et al. | 378/133 |
| 5,198,637 | 3/1993 | Noda et al. | 219/121.69 |
| 5,265,334 | 11/1993 | Lucier . | |
| 5,273,368 | 12/1993 | Asada et al. | 384/113 |
| 5,315,196 | 5/1994 | Yoshida et al. | 310/90 |

(List continued on next page.)

OTHER PUBLICATIONS

08/226,310 Hensel (Application) Apr. 1994 for a Fluid Bearing With Asymmetrical Groove Pattern.
08/284,812 Hensel (Application) Aug. 1994 for a Fluid Bearing Construction Employing Thrust Plate with Pressure Compensation Ports.

Primary Examiner—Irene Cuda
Assistant Examiner—Marc W. Butler
Attorney, Agent, or Firm—Miller Nash LLP

[57] ABSTRACT

A groove forming process for forming at least one groove pattern on the outer diameter of a shaft for use in a hydrodynamic bearing of a spindle motor. First, the shaft is inserted between a pair of dies, at least one of which has a groove pattern thereon. Next, the shaft is positioned so that it is perpendicular to the groove pattern and at one end of the groove pattern. By lowering the upper die, the shaft is clasped between the dies. The shaft is then rolled in a first direction over the groove pattern by simultaneously applying pressure in a vertical direction and applying pressure in a first horizontal direction to one of the pair of dies so that the shaft rolls in the first direction. The shaft is then rolled in a second direction over the groove pattern by simultaneously applying pressure in a vertical direction and applying pressure in a second horizontal direction to one of the pair of dies so that the shaft rolls in the second direction. The steps of rolling the shaft in the first and second directions is then repeated until the groove pattern is formed on the outer diameter of the shaft. Then the shaft may be released from between the dies by raising the upper die. At this point the shaft may be removed from between the dies and inspected.

21 Claims, 5 Drawing Sheets

U.S. PATENT DOCUMENTS

| | | | |
|---|---|---|---|
| 5,370,463 | 12/1994 | Asada et al. | 384/113 |
| 5,483,810 | 1/1996 | Stencil | 72/88 |
| 5,509,287 | 4/1996 | Garden | 72/88 |
| 5,579,579 | 12/1996 | Chen | 29/898 |
| 5,592,843 | 1/1997 | Tsung et al. | 72/88 |
| 5,653,540 | 8/1997 | Heine et al. | 384/123 |
| 5,683,183 | 11/1997 | Tanaka et al. | 384/100 |
| 5,716,141 | 2/1998 | Chen | 384/114 |
| 5,743,123 | 4/1998 | Yamamoto et al. | 72/88 |

GROOVE FORMING PROCESSES FOR SHAFT OUTER DIAMETER

BACKGROUND OF THE INVENTION

The present invention relates to a process for forming grooves on the outer diameters of a shaft of a spindle motor, wherein the grooves are used to generate appropriate hydrodynamic pressures in a hydrodynamic bearing.

Electric spindle motors of the type used in disk drives conventionally rely on ball bearings to support a rotary member, such as a rotating hub, on a stationary member, such as a shaft. Ball bearings are wear parts and in time friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat and noise, both of which are undesirable in a disk drive motor.

Hydrodynamic or fluid bearings are often used as a replacement for ball bearings in disc drives and other apparatus having rotating parts. In a motor using a fluid bearing, the rotating member is separated from the stationary member by a film of lubricating fluid. A fluid bearing offers several advantages over ball bearings such as low non-repeatable run-out, low audible noise, and high damping. Accordingly, fluid bearings represent a considerable improvement over conventional ball bearings in spindle drive motors.

Examples of fluid bearings are shown in U.S. Pat. Nos. 5,427,456 and 5,536,088 and U.S. patent application Ser. No. 08/591,735 to Charles J. Cheever, et al., which have been assigned to applicant's assignee and are incorporated herein. The motors shown in these references generally include the following parts: a central shaft integral with and perpendicular to a horizontal thrust bearing plate; a hub assembly having a sleeve surrounding the shaft as well as a radial upper surface that supports the thrust bearing plate; and a flanged bearing ring supported by the thrust bearing plate. Although generally the shaft is stationery and the hub assembly rotates, such motors are easily adaptable to rotating shafts paired with stationery hub assemblies.

Fluid thrust bearings are formed by lubricant within fluid bearing cavities of the motor. For example, an interior fluid bearing cavity is formed between the shaft and hub assembly in which at least one fluid thrust bearing supports the hub assembly on the shaft. A groove pattern or spiral groove geometry is provided on the outer diameter of the shaft or the inner diameter of the sleeve to generate the appropriate fluid pressure gradient and hydrodynamic pressures to retain the fluid within the bearing cavity. Other fluid bearing cavities may be formed between parallel surfaces such as between the lower surface of the flanged bearing ring and the upper surface of the horizontal thrust bearing plate and between the lower surface of the horizontal thrust bearing plate and the radial upper surface of the hub assembly. One or more of these surfaces may have a spiral groove pattern to provide an inward pumping action that maintains a pressure differential, pushing fluid radially inward toward the shaft.

Spiral groove geometry generates hydrodynamic pressures which support rotating motor parts (such as the sleeve) relative to stationary motor parts (such as the shaft) resulting in a desired bearing stiffness. One procedure used currently for grooving hydrodynamic bearing surfaces is to machine cut the inner diameter of the rotating sleeve or the outer diameter of the shaft. Creating grooves in this manner limits the designer to using only soft bearing materials which wear prematurely. These processes also tend to create burrs on the surfaces.

Another method of creating the groove pattern, disclosed in U.S. Pat. No. 5,315,196 to Yoshida, et al. includes printing a resist on a shaft and then electroplating the shaft. When the resist is removed, a groove pattern remains. Yoshida, et al. also briefly disclose methods for chemical etching, rolling, and laser-forming (U.S. Pat. No. 5,198,637 to Noda, et al., also shows the use of a laser to cut grooves in a hydrodynamic thrust bearing surface). Regarding the rolling method, the Yoshida, et al. reference indicates that an unwanted "shoulder" is formed within the groove.

None of these previous process are satisfactory because they have one or more of the following problems: they provide little flexibility over the specific design of the grooves; they create burrs on the bearings surfaces; they preclude the use of hardened bearing surfaces; they form unwanted shoulders; they distort the shaft; or they are extremely expensive.

SUMMARY OF THE INVENTION

The present invention relates to a process for creating a groove pattern on the outer diameter of a shaft of a hydrodynamic bearings using a groove forming process. The first step of the process includes inserting the shaft between a pair of dies, at least one of which has a groove pattern thereon. Next, the shaft is positioned so that it is perpendicular to the groove pattern and at a first position of the groove pattern. By lowering the upper die, the shaft is clasped between the dies. The shaft is then rolled in a first direction over the groove pattern by simultaneously applying pressure in a vertical direction and applying pressure in a first horizontal direction to one of the pair of dies so that the shaft rolls in the first direction. The shaft is then rolled in a second direction over the groove pattern by simultaneously applying pressure in a vertical direction and applying pressure in a second horizontal direction to one of the pair of dies so that the shaft rolls in the second direction. The steps of rolling the shaft in the first and second directions is then repeated until the groove pattern is formed on the outer diameter of the shaft. Then the shaft may be released from between the dies by raising the upper die so that the shaft may be removed from between the dies and inspected.

The process may be performed using a press in conjunction with precision dies that are manufactured with the necessary groove details. The press may use air cylinders to provide pressure in both the vertical and horizontal directions.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
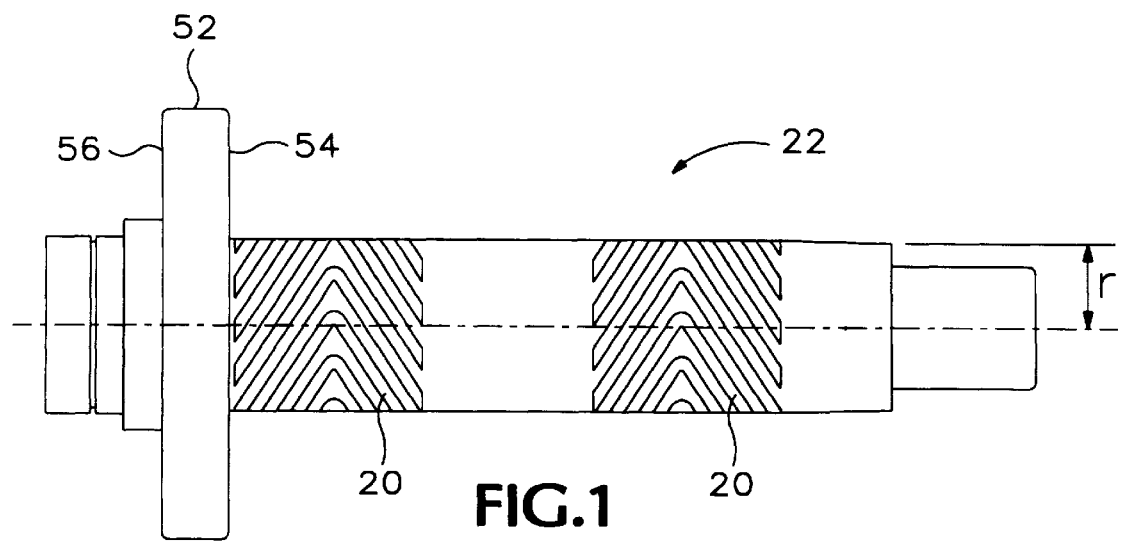
FIG. 1 is a shaft having grooves created by the groove forming process of the present invention.

The present invention is directed to a groove forming process for creating hydrodynamic pressure generating grooves or groove patterns 20 on the outer diameter of a shaft 22 (FIG. 1) that may be used in a spindle motor. The groove forming process of the present invention is generally accomplished using a hydraulic or pneumatic press 24 (FIGS. 2 and 3) in conjunction with precision dies 26a and 26b that are manufactured with the necessary groove details. The shaft 22 is positioned in the press 24 between a die 26a with the radial groove geometry or groove pattern 27 on it (shown in more detail as 27' in FIG. 5 and 27" in FIG. 6) and a blank die 26b. (Although the grooved die 26a is shown as a bottom die, an alternate embodiment of the press 24 could be made having the groove pattern 27 on the upper die 26b or having groove patterns 27 on both dies 26a and 26b.) The shaft 22 is rolled along the grooved die 26a to create grooves 20 where raised portions (shown as dark lines) in the groove pattern 27 form the indents (shown as light spaces) of the groove pattern 20 on the shaft 22.

Figure 2:
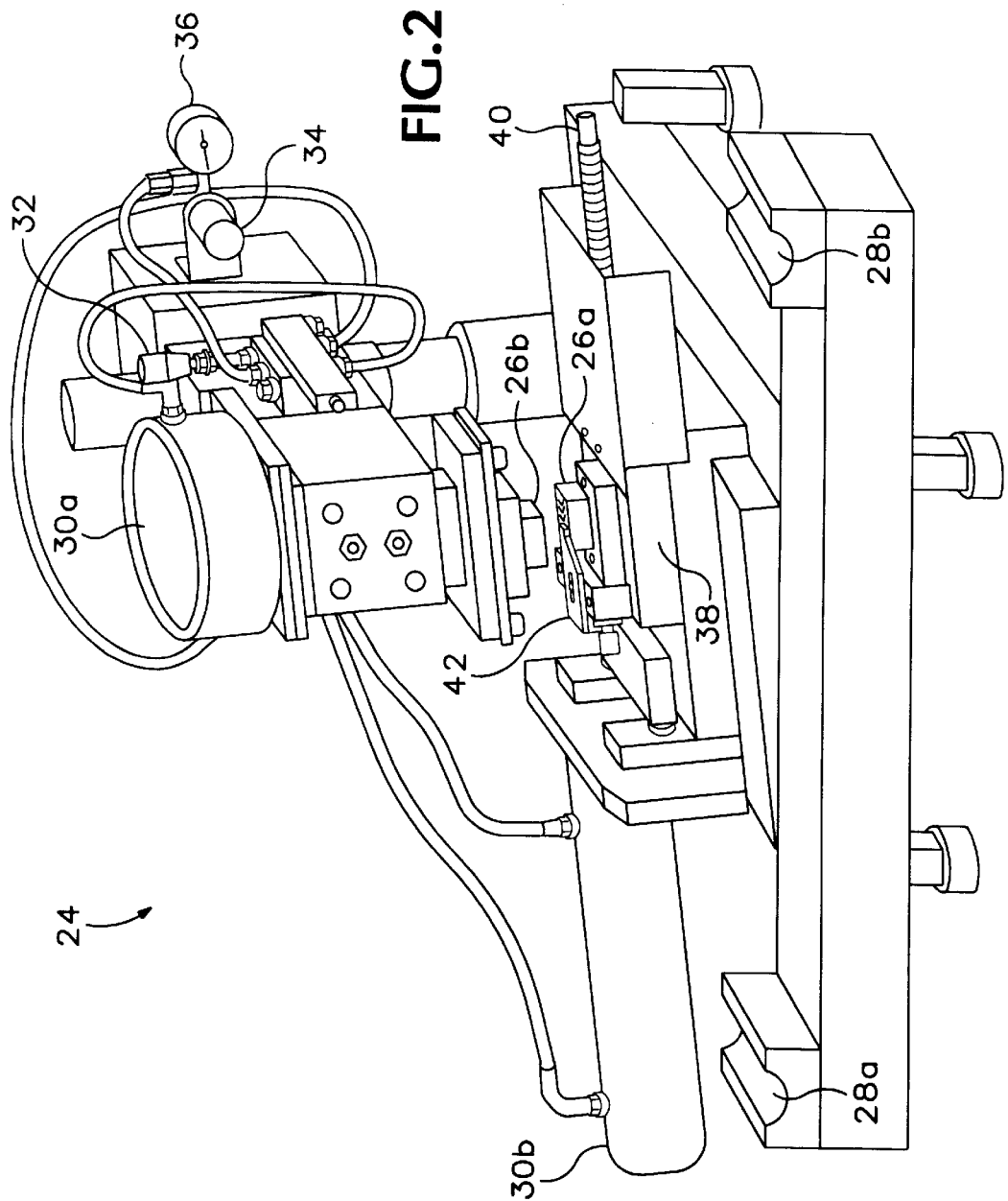
FIG. 2 is a press used to execute the groove forming process.
Figure 3:
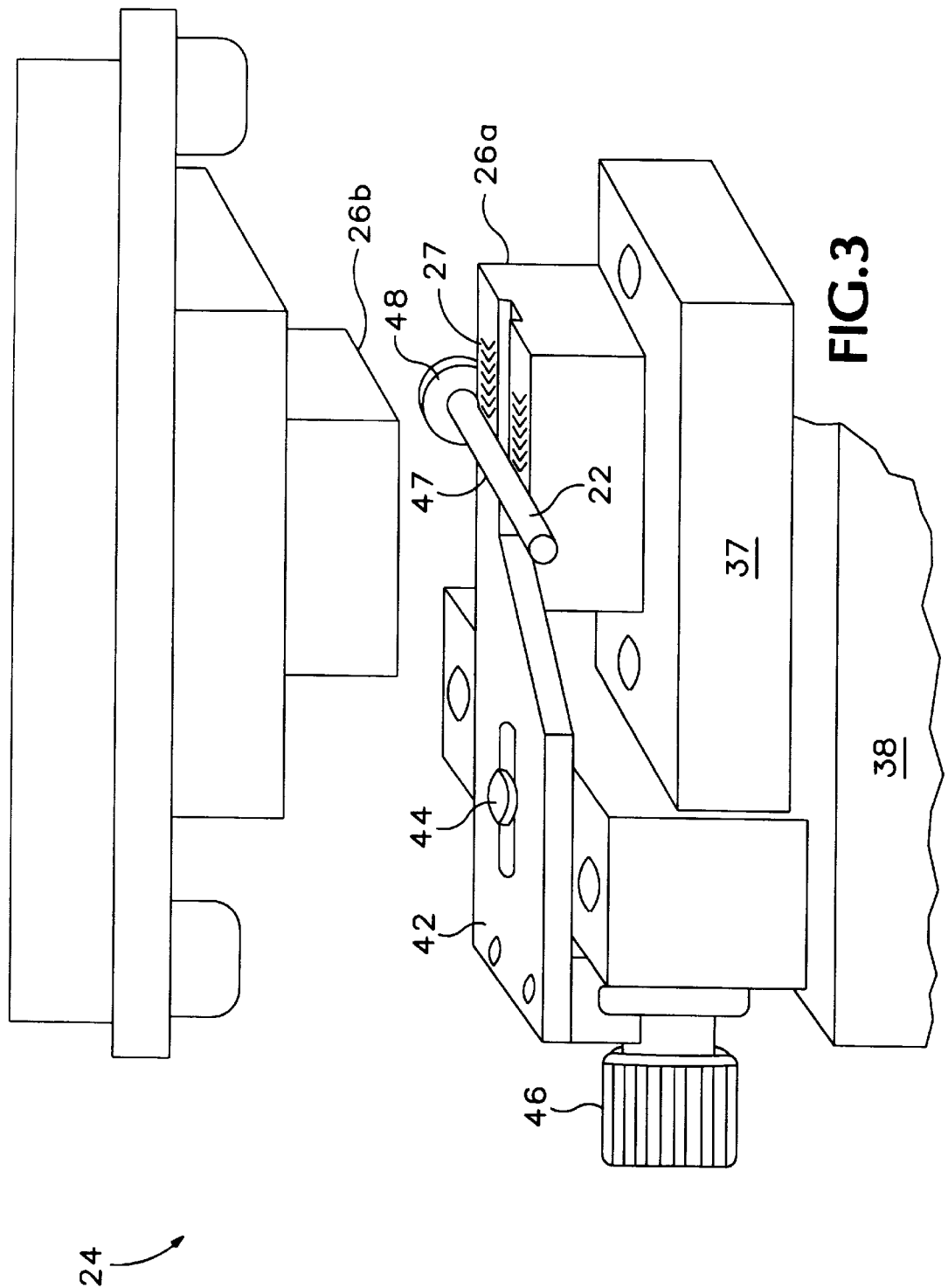
FIG. 3 is an enlarged view of the shaft stop and die sections of the press of FIG. 2.

The exemplary press 24 shown in FIGS. 2 and 3 includes several safety features. For example, left and right optical switches 28a and 28b are used to ensure that an operator's hands are away from the moving parts of the press 24. With the operator's hands safely on the switches 28a and 28b, the press may be activated.

The press 24, as shown, is a pneumatic press which uses air cylinders to provide pressure, however, other forms of pressure (including hydraulic pressure) may also be used. The press 24 uses a first air cylinder 30a to provide downward pressure and a second air cylinder 30b to provide the horizontal pressure which together cause the shaft 22 to roll. The amount of pressure supplied may be adjusted using an air release adjustment valve 32 and a downward pressure adjustment valve 34 (which can be monitored by a downward pressure gage 36). Although the press 24 may be operated manually, it may also be controlled by an auto controller (not shown) such as the Model 2200 auto controller produced by Control Tech. Corp.

Die 26a is mounted on die mount 37 which is attached to a linear slide 38. The linear slide 38 is actuated by air cylinder 30b which causes the linear slide 38 to travel in a first direction. The linear slide 38 has a stroke length (L), which is equal to the linear or horizontal distance the linear slide 38 travels when pushed may be adjusted using the stroke adjustment screw 40. The linear slide 38 does a forward stroke when it moves in a first direction. The linear slide 38 does a backward stroke when it moves in a second direction. Because there is both downward pressure and horizontal pressure, the shaft 22 rolls in the first direction when the linear slide 38 does a forward stroke and rolls in the second direction when the linear slide 38 does a backward stroke.

The press 24 also includes a shaft or rear mechanical stop 42 the position of which may be adjusted using the screw 44 and the knob 46. The shaft 22 rests against a stop edge 47 of the shaft stop 42 when it is in its proper starting position. The stop edge 47 is set ahead of the position at which the shaft 22 contacts the groove pattern 27. Generally the offset distance is equivalent to the radius (r) of the shaft 22 (FIG. 1). The reason for this offset is that the stop edge 47 of the shaft stop 42 contacts the shaft 22 at an outer edge of the shaft which has a horizontal distance equal to the radius (r) from the bottom of the shaft 22 where the shaft 22 contacts the groove pattern 27.

Figure 5:
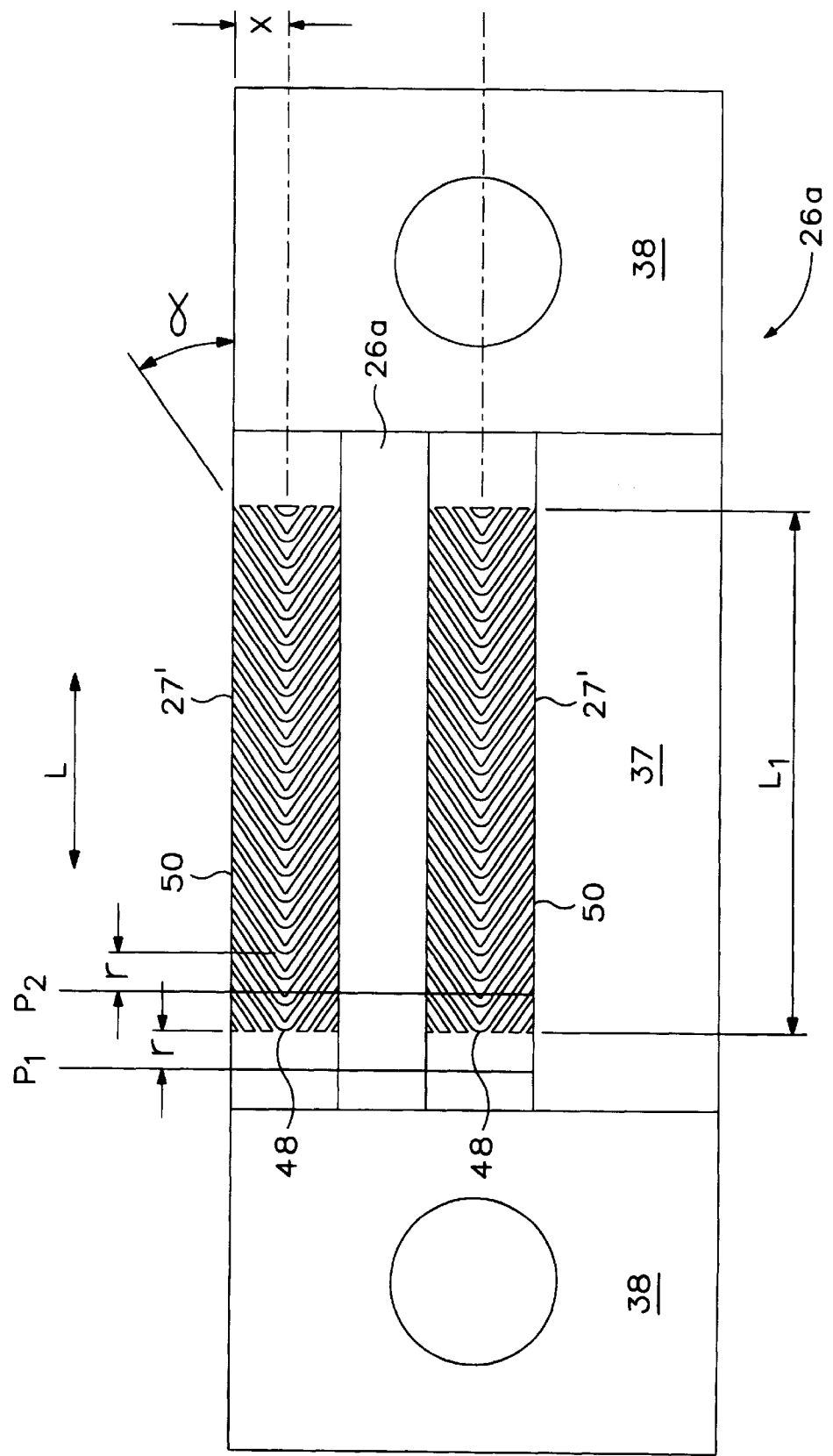
FIG. 5 is a first exemplary grooved die.

FIG. 5 shows an exemplary groove pattern 27' having a pattern length ($L_1$) on a die 26a having squared front and back ends. The minimum pattern length ($L_1$(min)) of the groove pattern 27' is determined by the following formula:

$$L_1(\text{min}) = 2\Pi r$$

This formula represents the exact circumference of the shaft 22. If the pattern length ($L_1$) is equal to the minimum length ($L_1$(min)), the stop edge 47 is set at $P_1$, and the stroke length (L) is set to the length of the shaft circumference. The shaft 22, which in its initial position rests against stop edge 47, rolls from the front end of the groove pattern 27' to the back end. If the length ($L_1$) of the groove pattern 27' is greater than $L_1$(min), the stop edge 47 is set at an intermediate position such as $P_2$ and the stroke length (L) is set to the length of the circumference. In this case the shaft 22 would not roll over the entire groove pattern 27'.

Figure 6:
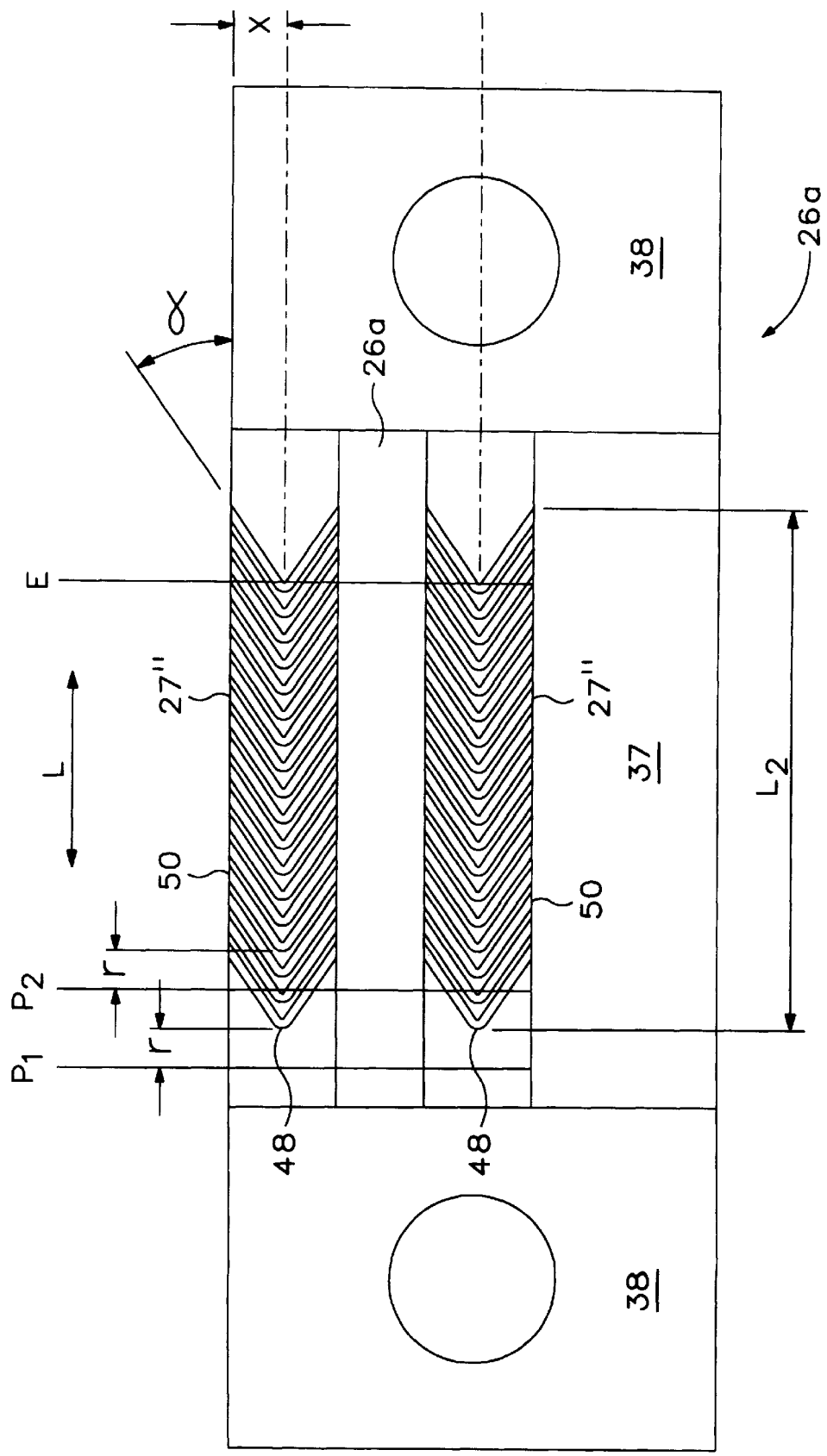
FIG. 6 is a second exemplary grooved die.

FIG. 6 shows an alternate groove pattern 27" (having a length ($L_2$)) on die 26a in which the groove pattern 27" has a front end that is complementary with the back end. The minimum length ($L_2$(min)) of the groove pattern 27" is determined by the following formula:

$$L_2(\text{min}) = 2\Pi r + (x/\text{Tan } \alpha)$$

where x is the distance from the groove point 48 to the outside edge of the groove 50 and $\alpha$ is the groove angle. If the groove point 48 is offset, it is preferable to use the longest side. If the pattern length ($L_2$) is equal to $L_2$(min), the stop edge 47 is preferably set at $P_1$ and the stroke length (L) is set to $2\Pi r + (x/\text{Tan}\alpha)$. The shaft 22, which in its initial position rests against stop edge 47, rolls from the front end of the groove pattern 27" to the back end. Since the front end of groove pattern 27" is complementary to the back end, the area of the shaft 22 which is not grooved by the front end of groove pattern 27" is grooved by the back end without overlapping.

If the length ($L_2$) of the alternate groove pattern 27" shown in FIG. 6 is determined by the following formula:

$$L_2(\text{alt}) = 2\Pi r + (2x/\text{Tan } \alpha)$$

then the stop edge 47 should be set at $P_2$ which is offset a distance equal to the radius (r) of the shaft 22 from the point at which the groove pattern 27" has grooves across its entire width. In this case the stroke length (L) may be set equal to the circumference of the shaft so that the bottom of the shaft rolls to E at the end of the stroke.

It should be noted that if the length of the alternate groove pattern 27" shown in FIG. 6 is greater than $L_2$(alt), then $P_2$ and E can be adjusted so that the shaft 22 can roll a distance equal to the circumference of the shaft 22 over a portion of groove pattern 27" where grooves are across the entire width of the pattern.

Finally, regarding the dies 26a and 26b, they may be constructed of materials such as metal, ceramic, or hard plastic. Preferably, the dies 26a and 26b are made of a compliant material such as a hard plastic known as DELRIN. The groove pattern 27 is formed in the dies having a depth that is deeper than the desired grooves 20 to allow for flexibility of the depth based on the pressure applied. At minimum, however, the depth of the groove pattern 27 is at least as deep as the grooves 20 desired on the shaft 22.

Before using the press 24 in the groove forming process of the present invention, the press 24 must be prepared to accommodate the specific shaft 22 to be grooved. For example, for a 3.5 mm stainless steel shaft 22, the press may be adjusted to the following settings:

ROLL MARKING SETTINGS

| Item | Setting |
| --- | --- |
| Downward Cylinder Pressure | 15–30 PSI |
| Linear Slide Cylinder Pressure | 75–80 PSI |
| Downward Pressure Adjustment | Fully Turned Clockwise |
| Stroke Length | L |
| Number of Times Rolled | 8–15 Rolls |
| Linear Slide Delay | 2 Seconds |
| Time Between Rolls | 1 Second |

It is also important that the linear slide 38 rests at its far right location, the press 24 is level, the stroke length set at an appropriate length (discussed above), and the shaft 22 is positioned to rest against stop 47). Compressed air may be inserted (between 80 and 100 PSI and at constant rate) into an inlet to the air filter/regulator assembly (not shown). The air should be clean, cool, and dry. Finally, the linear slide 38 may be tested, with the air hose disconnected and the machine unplugged, to verify that the linear slide 38 is running smoothly by manually moving it to its extreme positions. Lubricant should be applied to the linear slide 38 every 40 hours of operation.

As mentioned above, the press 24 of the preferred embodiment includes safety features that encourage safe operation and prevent misuse. Accordingly, to start the machine an operator places his index fingers simultaneously onto optical switches 28a and 28b. The press 24 will automatically stop at the end of its cycle or if one or both of the fingers are removed from the optical switches 28a and 28b.

Assuming the press 24 is prepared and operated as set forth above, the groove forming process of the present invention is comprised of the following steps. First, the shaft 22 is inserted between a pair of dies 26a and 26b, at least one of which has a groove pattern 27 thereon. Next, the shaft 22 is positioned so that it is perpendicular to the groove pattern 27 at a position on the groove pattern 27. The distance between the dies 26a and 26b is then closed, generally by lowering the upper die 26b, so that the shaft 22 is clamped between the dies. The shaft 22 is then rolled in a first direction over the groove pattern 27 by simultaneously applying pressure in a vertical direction and applying pressure in a first horizontal direction to one of the pair of dies 26a so that the shaft 22 rolls in the first direction. The shaft 22 is then rolled in a second direction over the groove pattern 27 by simultaneously applying pressure in a vertical direction and applying pressure in a second horizontal direction to one of the pair of dies 26a so that the shaft 22 rolls in the second direction. The steps of rolling the shaft in the first and second directions is then repeated until grooves 20 are formed on the outer diameter of the shaft 22. Then shaft 22 is released from between the dies 26a and 26b by increasing the distance between the dies, generally by raising the upper die 26b. At this point the shaft 22 may be removed from between the dies 26a and 26b and inspected.

Figure 4:
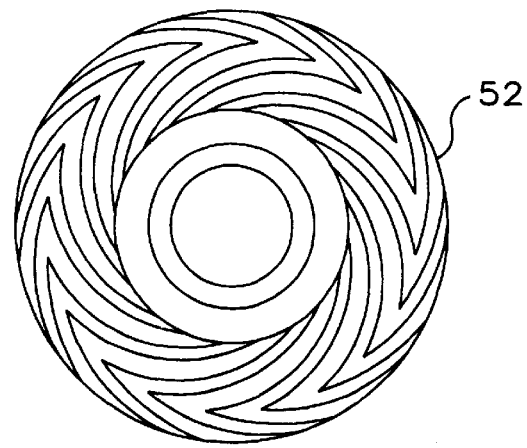
FIGS. 4 is an exemplary thrust groove pattern on a surface perpendicular to a shaft.

It should be noted that if the shaft 22 includes an integral horizontal thrust bearing plate 22 with a lower thrust surface 54 (FIG. 1), the shaft 22 is positioned so that the thrust surface 54 is flush against the side of the bottom die 26a. Further, if the shaft 22 includes an integral thrust bearing plate 52, the process may also include the step of coining a groove pattern (shown in FIG. 4) on the upper surface 56, lower surface 54, or both surfaces of the thrust bearing plate 52.

The above mentioned process would be adjusted depending on several significant features including the size of the shaft 22, the density of the material from which the shaft is made, the depth of the desired grooves 20, and the ratio between the number of grooves 20, the shaft diameter, and the groove 20 width. The pressure setting and number of rolls is highly dependent on these features and may be set by trial and error. The above mentioned settings were based on a shaft made from stainless steel. Using aluminum, however, would require pressure between 30 and 50 PSI with 5 to 10 rolls. Using a mild steel would require pressure between 50 and 70 PSI with 10 to 15 rolls. These examples are meant to be exemplary and not to limit the scope of the invention.

In using the press 24 to implement the process of the present invention, it is foreseen that some problems with the press may occur. For example, if the grooves 20 seem to be deeper on one side of the shaft 22 than the other, it is probable that the downward pressure is too high (and should be lowered). This is because after the grooves 20 are cut by the bottom die 26a they travel to the top die 26b which compresses them. Another problem is that the shaft 22 may end up with a poor surface finish with grooves 20 that are barely visible. In this case it is probable that the dies 26a and 26b are not in alignment with the linear slide 38 and thus the shaft 22 is forced to skew which results in a grinding action between the shaft 22 and the dies 26a and 26b. This problem can be solved by aligning the linear slide 38. Yet another problem that may occur is that the grooves 20 may be more defined on either the top or bottom of the shaft 22. In this case the dies 26a and 26b are probably not completely parallel to each other and should be removed and checked using a height gage to ensure that the surfaces are flat and free from dirt and oil. Other problems may occur which can be solved in a similar manner.

It should also be noted that the present invention may be used to form alternate groove patterns. For example, the present invention may form a groove pattern such as the one shown in U.S. patent application Ser. No. 08/490,067 to Hazelton, et al., which has been assigned to applicant's assignee and is incorporated herein. The groove pattern would be determined by the groove pattern on the patterned die 26a.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A precise groove forming process, said process comprising the steps of:

(a) providing a shaft for use in a hydrodynamic bearing of a spindle motor;

(b) inserting said shaft between a pair of dies spaced apart, said pair of dies including a first die having at least one groove pattern and a second die;

(c) positioning said shaft perpendicular to said at least one groove pattern and at a first pattern position of said at least one groove pattern;

(d) clamping said shaft between said pair of dies;

(e) simultaneously applying pressure in a vertical direction between said pair of dies and applying pressure in a first horizontal direction to one of said pair of dies so that said shaft rolls in a first direction over said at least one groove pattern from said first pattern position to a second pattern position of said at least one groove pattern;

(f) simultaneously applying pressure in a vertical direction between said set of dies and applying pressure in a second horizontal direction to one of said pair of dies so that said shaft rolls in a second direction over said at least one groove pattern from said second pattern position to said first pattern position; and (g) performing steps (e) and (f) until said at least one groove pattern is formed on the outer diameter of said shaft.

2. The process of claim 1, further comprising the steps of releasing said shaft by spacing said pair of dies at said first distance and removing said shaft from between said pair of dies.

3. The process of claim 1, further comprising the step of inspecting said shaft for groove depth, burr height, and groove consistency.

4. The process of claim 1 wherein step (d) further comprises the step of lowering said second die to said first die.

5. The process of claim 1, further including the step of releasing said shaft by raising said second die from said first die.

6. The process of claim 1 wherein said first pattern position is at a first end of said at least one groove pattern and said second pattern position is at a second end of said at least one groove pattern, and step (e) further comprises rolling said shaft from said first end to said second end, and step (f) further comprises rolling said shaft from said second end to said first end.

7. The process of claim 1 wherein said shaft has a circumference length ($2\Pi r$) and said groove pattern has a pattern length ($2\Pi r$) equal to said circumference length, and step (e) further comprises applying pressure in said first horizontal direction sufficient to roll said shaft a distance ($2\Pi r$) equal to said pattern length, and step (f) further comprises applying pressure in said second horizontal direction sufficient to roll said shaft a distance ($2\Pi r$) equal to said pattern length.

8. The process of claim 1 wherein said shaft has a circumference length ($2\Pi r$) and said groove pattern has a pattern length greater than said circumference length, and step (e) further comprises applying pressure in said first horizontal direction sufficient to roll said shaft a distance ($2\Pi r$) equal to said circumference length, and step (f) further comprises applying pressure in said second horizontal direction sufficient to roll said shaft a distance ($2\Pi r$) equal to said circumference length.

9. The process of claim 8 wherein said groove pattern has a squared front edge and a squared back edge, and step (c) includes positioning said shaft at a first pattern position that is at least a distance equal to said circumference length from said back edge.

10. The process of claim 8 wherein said groove pattern has a maximum pattern width between said first pattern position and said second pattern position.

11. The process of claim 1 wherein said shaft has a circumference length ($2\Pi r$) and said groove pattern has a pattern length $2\Pi r + (x/\tan\alpha)$ greater than said circumference length, said groove pattern has a front edge and a complementary back edge, and step (e) further comprises applying pressure in said first horizontal direction sufficient to roll said shaft the distance $2\Pi r + (x/\tan\alpha)$ of said pattern length, and step (f) further comprises applying pressure in said second horizontal direction sufficient to roll said shaft the distance $2\Pi r + (x/\tan\alpha)$ of said pattern length.

12. The process of claim 1 wherein said shaft has an integral horizontal thrust bearing plate with a lower thrust surface, and step (c) further includes the step of positioning said shaft so that said thrust surface is flush against a side of said first die.

13. The process of claim 1 wherein said shaft includes an integral thrust bearing plate perpendicular to said shaft, said process further comprising the step of coining a spiral groove pattern on said thrust bearing plate.

14. The process of claim 1 wherein said shaft is a 3.5 mm aluminum shaft, and step (e) further comprises applying between 5 and 10 PSI of pressure in said first horizontal direction, and step (f) further comprises applying between 5 and 10 PSI of pressure in said second horizontal direction, and step (g) further comprises performing steps (e) and (f) between 5 and 10 times.

15. The process of claim 1 wherein said shaft is a 3.5 mm mild steel shaft, and step (e) further comprises applying between 10 and 25 PSI of pressure in said first horizontal direction, and step (f) further comprises applying between 10 and 25 PSI of pressure in said second horizontal direction, and step (g) further comprises performing steps (e) and (f) between 8 and 15 times.

16. The process of claim 1 wherein said shaft is a 3.5 mm stainless steel shaft, and step (e) further comprises applying between 15 and 30 PSI of pressure in said first horizontal direction, and step (f) further comprises applying between 15 and 30 PSI of pressure in said second horizontal direction, and step (g) further comprises performing steps (e) and (f) between 8 and 15 times.

17. A precise groove forming process for forming at least one groove pattern on an outer diameter of a shaft for use in a hydrodynamic bearing of a spindle motor, said process comprising the steps of:

(a) providing a shaft for use in a hydrodynamic bearing of a spindle motor;

(b) inserting said shaft between a pair of dies spaced apart, said pair of dies including a first die having at least one groove pattern and a second die;

(c) positioning said shaft perpendicular to said at least one groove pattern and at a first pattern position of said at least one groove pattern;

(d) clamping said shaft between said pair of dies;

(e) simultaneously applying pressure in a first pressure direction between said pair of dies and applying pressure in a second pressure direction perpendicular to said first pressure direction to one of said pair of dies so that said shaft rolls in a first rolling direction over said at least one groove pattern from said first pattern position to a second pattern position of said at least one groove pattern;

(f) simultaneously applying pressure in said first pressure direction between said set of dies and applying pressure in a third pressure direction perpendicular to said first pressure direction and opposite to said second pressure direction to one of said pair of dies so that said shaft rolls in a second rolling direction over said at least one groove pattern from said second pattern position to said first pattern position; and (g) performing steps (e) and (f) until said at least one groove pattern is formed on the outer diameter of said shaft.

18. A precise groove forming process for forming at least one herringbone groove pattern on an outer diameter of a shaft for use in a hydrodynamic bearing of a spindle motor, said process comprising the steps of:

(a) providing a shaft for use in a hydrodynamic bearing of a spindle motor;

(b) inserting said shaft between a pair of dies spaced apart, said pair of dies including a first die having at least one groove pattern and a second die;

(c) positioning said shaft perpendicular to said at least one groove pattern and at a first pattern position of said at least one groove pattern;

(d) clamping said shaft between said pair of dies;

(e) simultaneously applying pressure in a first pressure direction between said pair of dies and applying pressure in a second pressure direction perpendicular to said first pressure direction to one of said pair of dies so that said shaft rolls in a first rolling direction over said at least one groove pattern from said first pattern position to a second pattern position of said at least one groove pattern;

(f) simultaneously applying pressure in said first pressure direction between said set of dies and applying pressure in a third pressure direction perpendicular to said first pressure direction and opposite to said second pressure direction to one of said pair of dies so that said shaft rolls in a second rolling direction over said at least one groove pattern from said second pattern position to said first pattern position; and (g) performing steps (e) and (f) until said at least one groove pattern is formed on the outer diameter of said shaft.

19. The process of claim 17 wherein said shaft has a circumference length (2Πr) and said groove pattern has a pattern length (2Πr) equal to said circumference length, and step (e) further comprises rolling said shaft a distance (2Πr) in said first rolling direction, and step (f) further comprises rolling said shaft a distance (2Πr) in said second rolling direction.

20. The process of claim 17 wherein said shaft has a circumference length (2Πr) and said groove pattern has a pattern length greater than said circumference length, and step (e) further comprises rolling said shaft a distance (2Πr) in said first rolling direction, and step (f) further comprises rolling said shaft a distance (2Πr) in said second rolling direction.

21. The process of claim 17 wherein said shaft has a circumference length (2Πr) and said groove pattern has a pattern length 2Πr+(x/Tanα) greater than said circumference length, said groove pattern has a front edge and a complementary back edge, and step (e) further comprises rolling said shaft the distance 2Πr+(x/Tanα) in said first rolling direction, and step (f) further comprises rolling said shaft the distance 2Πr+(x/Tanα) in said second rolling direction.

* * * * *